J. G. VINCENT.
SHIFTING MECHANISM.
APPLICATION FILED JULY 3, 1916.
1,321,165.
Patented Nov. 11, 1919
3 SHEETS—SHEET 2.
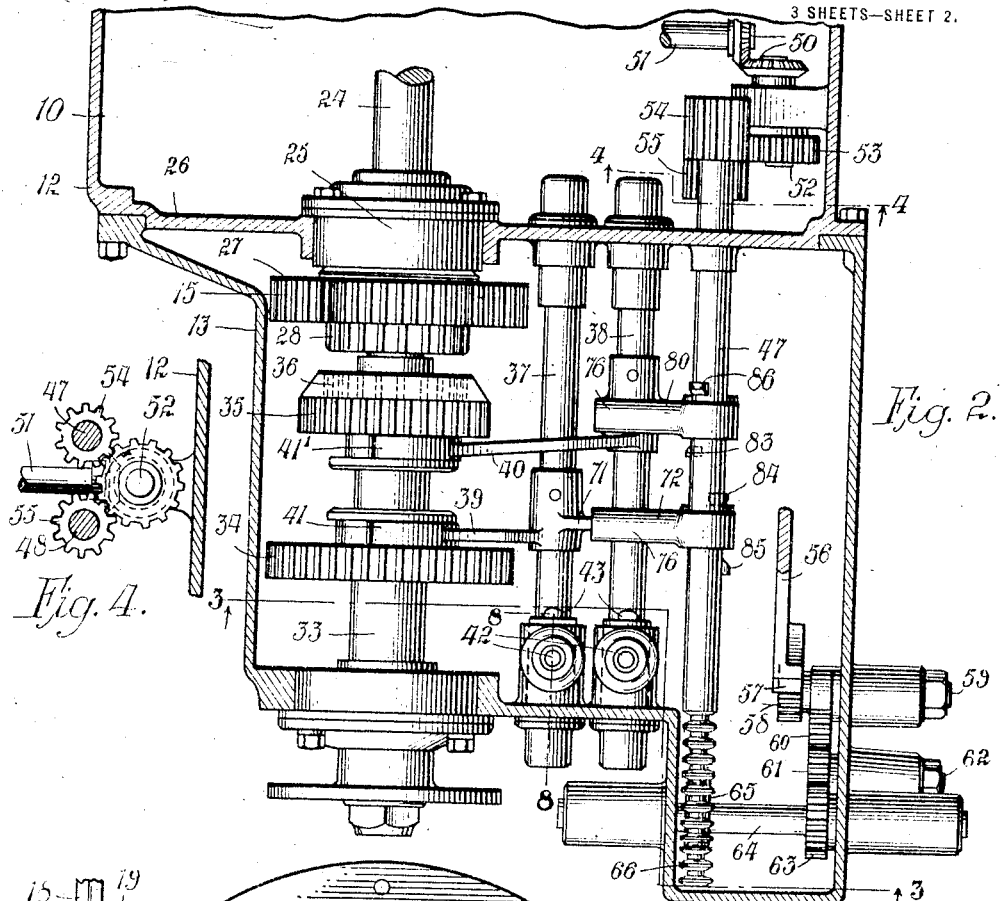
Fig. 2.
Fig. 4.
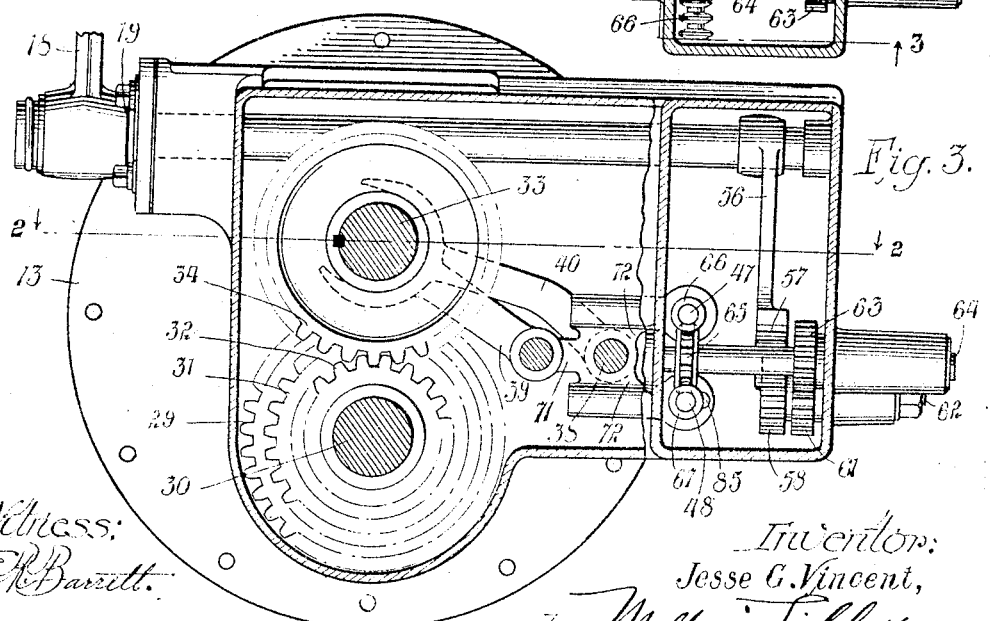
Fig. 3.
Witness:
E. R. Barrett.
Inventor:
Jesse G. Vincent,
by Milton Tibbetts,
Atty.

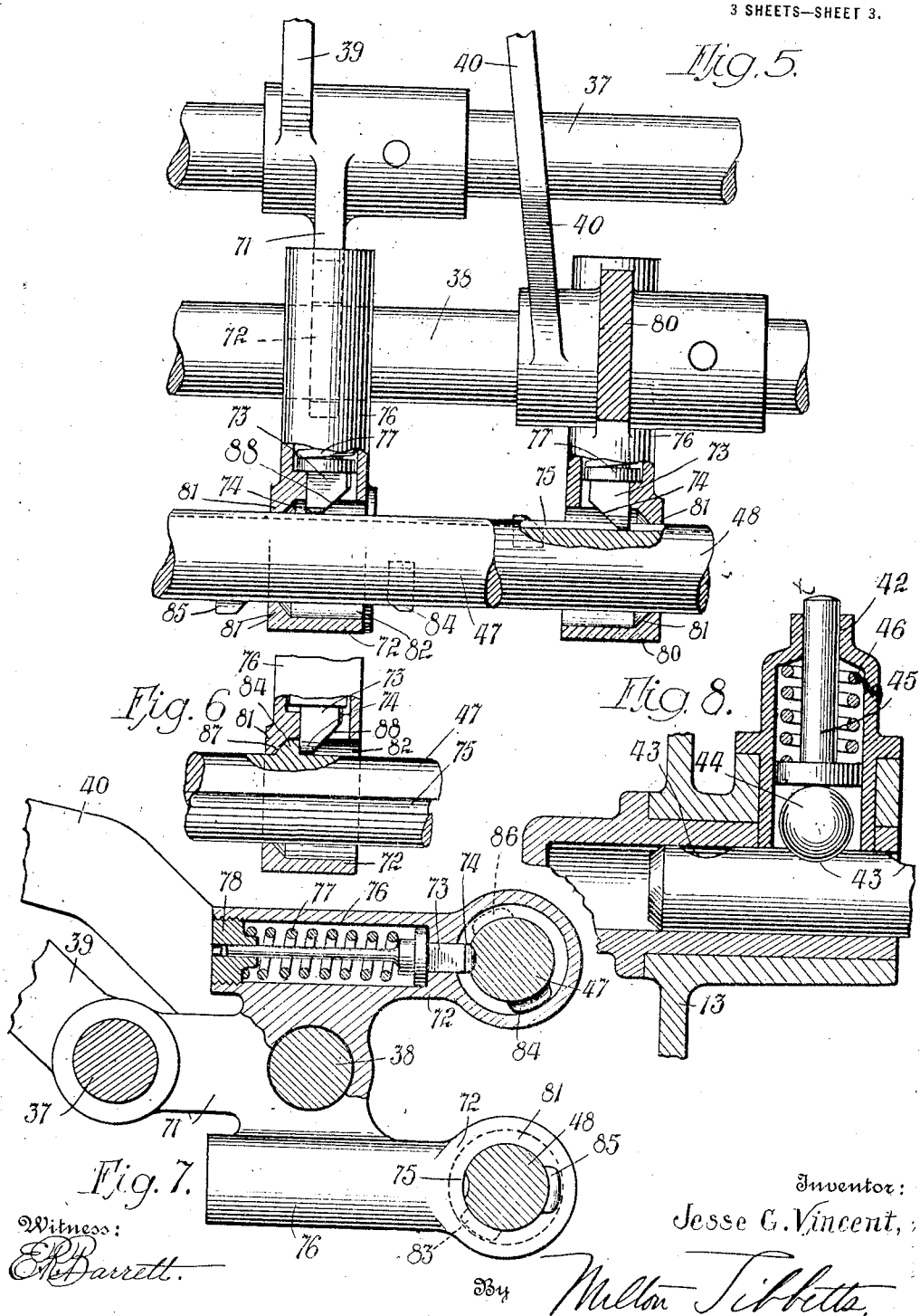

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

SHIFTING MECHANISM.

1,321,165.  Specification of Letters Patent.  Patented Nov. 11, 1919.

Application filed July 3, 1916. Serial No. 107,428.

*To all whom it may concern:*

Be it known that I, JESSE G. VINCENT, a citizen of the United States, and resident of Detroit, Wayne county, State of Michigan, have invented certain new and useful Improvements in Shifting Mechanism, of which the following is a specification.

This invention relates to motor vehicles, and particularly to the clutch and gear shifting mechanism thereof.

The salient object of the invention is to provide a simple and practical pre-selective type of gear shifting mechanism.

Another object of the invention is to provide an improved form of gear shifter mechanism operated by the clutch lever of a motor vehicle.

Other objects and advantages of the invention will appear from the following description taken in connection with the drawings which form a part of this specification, and in which:

Fig. 2 is a plan view, partly in section, of the gearing and gear shifter mechanism shown in Fig. 1, the section being approximately on the line 2—2 of Fig. 3;

Fig. 3 is a vertical transverse section approximately on the line 3—3 of Fig. 2;

Fig. 4 is a detail vertical section on the line 4—4 of Fig. 2;

Fig. 5 is an enlarged plan view of the operating and gear shifter elements with parts broken away to more clearly illustrate the construction;

Fig. 6 is a fragmentary view of some of the parts illustrated in Fig. 5, with one of the operating bars in another position;

Fig. 7 is an enlarged detail section approximately on the line 7—7 of Fig. 1; and Fig. 8 is an enlarged vertical section on the line 8—8 of Fig. 2.

Figure 1:
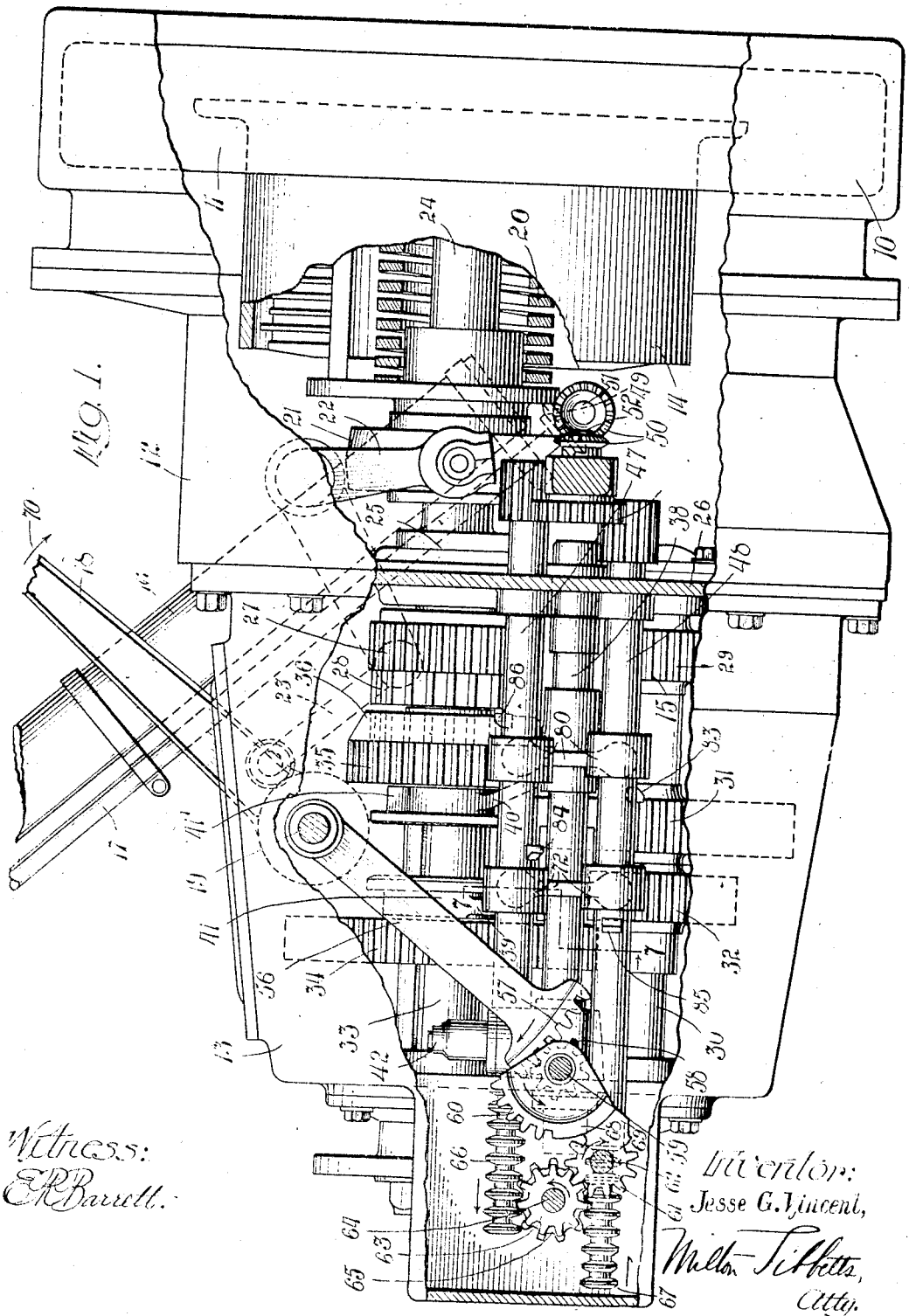
Figure 1 is a side elevation of a clutch and gearing of a motor vehicle embodying one form of this invention, parts being broken away.

Referring to the drawings, 10 represents a supporting casing mounted on the forward part of a motor vehicle and in the form shown it houses the flywheel 11 of the motor. Detachable sections 12 and 13 of this casing also house the clutch 14 and gearing 15, respectively. A steering column 16 is suitably mounted on the vehicle and a gear selecting rod 17 is supported thereby.

A clutch operating lever 18, usually in the form of a foot lever, is pivotally mounted at 19 on the supporting casing. The clutch spring 20 may be compressed by the operator through the connection to the lever 18 comprising a yoke 21, a bell crank lever 22, and a connecting link 23. These are the usual clutch operating connections.

The clutch shaft 24 connects through a bearing 25 in the wall 26 of the supporting casing with a driving gear 27, and one of the elements 28 of a direct drive clutch. The gear 27 is in constant mesh with a gear 29 fixed on a parallel lay shaft 30, upon which are also fixedly secured two other gears 31 and 32. A driven shaft 33 is arranged in line with the shaft 24, and has slidably keyed thereon two gear elements 34 and 35. In the drawings these gear elements are shown in neutral position and it will be understood that the gear 34 may be moved forwardly to mesh with the gear 32 on the lay shaft, or it may be moved from neutral position toward the rear to mesh with an intermediate reverse gear, not shown. Also, the gear element 35 carries the other element 36 of the direct drive clutch above referred to, and it will be understood that the gear element 35 may be moved forwardly so that the clutch elements 28 and 36 engage for directly driving the shaft 33 by the shaft 24, or the gear element 35 may be moved rearwardly to engage the gear 31 on the lay shaft.

By the above described arrangement three different gear ratios and one reverse are obtainable as between the driving shaft 24 and the driven shaft 33.

A pair of parallel shifter rods 37 and 38 are mounted in the casing adjacent the gears. The rods are provided with arms 39 and 40 respectively, rigidly secured to them and having yokes 41 and 41' adapted to slide the gear elements 34 and 35 above referred to. These rods 37 and 38 are yieldingly retained in neutral and gear positions by spring dogs 42 operating in notches 43. One of these dogs is shown in Fig. 8, where it is seen that the ball 44 is spring pressed into the notches 43 by a bolt 45 and spring 46. There are three notches 43 in each of the shifter rods and it will be understood that each rod is connected to shift one of the gear elements and is adapted to move in either of two directions from a neutral position for the purpose of so shifting the gear elements.

In the form of the invention illustrated herein, the shifter rods 37 and 38 are adapted to be selectively shifted by a pair of operating elements or bars 47 and 48, these bars being arranged parallel to the shifter rods and at one side thereof. They are suitably supported in the casing and arranged for both rotation and reciprocation. They are rotated to select the particular shifter rod to be moved and they are reciprocated to move that rod. They are rotated by the selector rod 17 above referred to, acting through two pairs of bevel gears 49 and 50, a shaft 51, a stub shaft 52, and a spur gear 53 meshing with gears 54 and 55 arranged on the forward ends of said bars 47 and 48, respectively. The gears 54 and 55 have somewhat wider faces than the gear 53, so that they may remain in constant mesh with the latter gear throughout their reciprocating movements. It will be seen, therefore, that this gear 53 forms a gear connection between the operating bars 47 and 48 whereby they may be rotated together to select the desired gear element to be shifted.

The operating bars 47 and 48 receive their reciprocating movement from the clutch lever 18. This is accomplished by an arm 56 having a toothed segment 57 meshing with a small pinion 58 on a shaft 59, a toothed segment 60 on said latter shaft meshing with a pinion 61 on a shaft 62, and another pinion 63 meshing with the pinion 61 and mounted on a shaft 64 which extends across the casing as shown in Figs. 1 and 2 and between the rear ends of the operating bars 47 and 48 where it is provided with a gear 65 meshing with racks 66 and 67 formed on the rear ends of said bars. Referring particularly to the segment 60, it will be seen that the part 68 thereof is plain and engages a plain segmental part 69 of the pinion 61, thereby holding the latter stationary during a part of the movement of the said segment 60. This is for the purpose of permitting a partial operation of the clutch lever 18 without operating the bars 47 and 48.

By the above train of gears it will be seen that the declutching movement of the clutch lever 18, which is in the direction of the arrow 70 in Fig. 1, causes a movement of the several gears and racks in the directions of the several arrows thereon. Thus in Fig. 1, the parts are shown with the clutch engaged and the disengaging movement of the clutch lever will cause a reciprocation of the operating bar 47 toward the left and a simultaneous reciprocation of the bar 48 toward the right. The return movement of the clutch lever which will be caused by the operation of the spring 20, will cause a reverse movement of the operating bars 47 and 48, so that except for the initial and final movements of the clutch lever in which the plain part 68 of the gear 60 retains the pinion 61 in locked position, the operating bars 47 and 48 are always operated with the clutch lever. In order that this reciprocation of the operating bars 47 and 48 may be accomplished without interfering in any way with their selective rotation, the racks 66 and 67 are of annular form as shown in the drawings.

In addition to the arm 39, the rod 37 has an arm 71 shown as extending laterally on the other side of the rod 37 and bifurcated to form branch arms 72 extending to the operating bars 47 and 48. The upper branch arm 72 surrounds the bar 47 and the lower branch arm 72 surrounds the operating bar 48, this construction being particularly well shown in Figs. 5, 6 and 7. Each of these arms is provided with a spring catch 73 having a rounded nose 74, which may operate in a longitudinal slot 75 in the operating bars in neutral position. The catch 73 is housed in a hollow part 76 of the arm 72 and a spring 77 is removably retained therein by a plug 78.

Referring particularly to Fig. 7 it will be seen that the arm 71 surrounds the rod 38, but there is no connection between these two parts as the rod 38 is adapted to slide freely relative to the arm, this arm 71 being secured to the rod 37.

The rod 38, in addition to the arm 40, has laterally extending arms 80 similar to the branch arms 72 of the rod 37. These arms 80 are arranged somewhat forwardly of the arms 72 and their ends surround the respective operating bars 47 and 48 similarly to the branch arms 72 of the arm 71. Similar catches 73 are also provided in the arms 80. For the purpose of more clearly bringing out the construction of these several arms, the arm 72 which surrounds the operating bar 47 and the arm 80 which surrounds the operating bar 48, are shown in section in Fig. 5. The arms 72 and 80 which surround the bar 47 are alike in that the end walls 81 thereof, which closely surround the said bar, are arranged at the left hand or rear face of the arms, thus leaving an annular space 82 surrounding the bar forwardly of said wall 81. The arms 72 and 80 which surround the operating bar 48 are similarly formed except that their corresponding walls 81 are arranged forwardly or at the right in Fig. 5.

The walls 81 above referred to form abutments for shifting lugs 83, 84, 85 and 86 on the operating bars 47 and 48. The lugs 83 and 85 are on the bar 48 and the lugs 84 and 86 are on the bar 47, and these lugs are so arranged on said bars relatively to the abutments 81 with which they coöperate that they will strike their respective abutments and shift to neutral position either of the rods 37 or 38 that is out of neutral position whenever the operating bars 47 and 48 are given a full reciprocation or full movement from the position in which they are shown in Fig. 1 to the other end of the stroke of said bars. This is done regardless of the angular selective position of the bars 47 and 48.

With the parts in the neutral position shown in Figs. 5 and 7, the return movement of the bars 47 and 48 to the position shown in full lines in Fig. 1, would leave both shifter rods 37 and 38 in their neutral position and no gears would be shifted. But if the operating rods 47 and 48 are rotated so that one of the lugs 83, 84, 85 or 86 is in a gear position, the particular lug, say 84 for instance, will be moved into the annular space 82 of the branch arm 72 and the beveled face 87 of said lugs will strike the beveled face 88 of the catch 73 and cause such catch to retract so that the lug may pass beyond it and abut against the wall 81. As soon as the lug 84 has reached that position the catch 73 will spring outwardly to a position behind said lug, as shown in Fig. 6, and upon the return movement of the bar 47 the arm 72 and consequently the shifter rod 37 will be carried with it. This movement of the shifter rod 37 will of course move the gear element 34 into mesh with the gear 32 on the lay shaft 30, the other gear element 35 remaining in neutral position. When reaching full gear position the shifter rod 37 will be yieldingly locked by one of the dogs 42 above described, and it will consequently remain in that position until the bar 47 is again reciprocated when it will be returned to neutral position regardless of whether or not the lug 84 has been shifted by the rotation of the bar 47 to preselect another gear.

By referring to the drawings, it will be seen that the lug 84 if properly positioned relative to its respective catch 73 will shift the gears into first or low gear position, the lug 83 will change them to second speed position, the lug 86 to third or direct drive position, and the lug 85 to reverse gear position.

The shifting lugs 83, 84, 85, and 86 are beveled off somewhat on their sides so that the bars 47 and 48 may be rotated regardless of the position of the lugs relative to their respective catches 73. Thus if the bars 47 and 48 were shifted so that the lugs were alongside of the catches, the bars could not be rotated for making a gear selection if the sides of the lugs and catches were straight. Beveling both of these parts permits preselection of the gears at any time.

Having thus described my invention, what I claim and desire to secure by Letters Patent is:

1. In a gear shifting mechanism, in combination, two gear shifting devices, two operating elements movable to enable adjustment thereof to be effected relatively to the gear shifting devices to position them selectively in respect to said devices, common controlling means for simultaneously moving said elements in said adjustment, said elements being also movable to move the gear shifting devices, and means to connect either of said elements separately to either of said gear shifting devices, but not to both of the latter for effecting the movement of the connected device as the elements are moved.

2. In a gear shifting mechanism in combination, two gear shifting devices, two operating elements, means for simultaneously moving said elements rectilinearly in opposite directions, and means independent of said first named means for moving both said elements to connect either separately to either but not both of said devices for shifting the connected device as the elements are moved.

3. In a gear shifting mechanism, in combination, a pair of shifter rods, two operating elements having two sets of movements, one to effect the adjustment of said elements into position to engage and disengage said shifter rods, and the other to effect the gear shifting movement of said rods, a common controlling means for simultaneously moving both of said elements to connect either one thereof to either, but not both, of said shifter rods for enabling one of said rods to be shifted at a time, as said elements are moved, and common means for simultaneously moving said elements in opposite directions to effect such shifting movement of the rods.

4. In a motor vehicle, in combination, gear shifter rods two operating bars, means for rotating one of said bars into engagement with one of said rods and means for simultaneously moving said bars in opposite directions to shift the engaged rod.

5. In a motor vehicle, in combination, gear shifter rods, two operating bars adapted to move one of said rods at a time in one direction, means for simultaneously moving said bars to connect one of said bars with one of said rods and means to move said bars simultaneously in another direction to shift the connected rod.

6. In a motor vehicle, in combination, gear shifter rods, two operating bars, means for simultaneously moving said bars into position to connect one of said bars with one of said rods, controlling means for said bars operable in one direction to effect the movement of both bars, and means for simultaneously moving said bars in opposite directions to shift the engaged rod.

7. In a motor vehicle, in combination, a pair of parallel gear shifter rods, each adapted to be moved in opposite directions from a neutral position, two operating bars parallel to said rods and adjacent thereto, an arm on each of said rods having a part bearing on each of said bars, and means on said bars for selectively engaging one of said parts and thereby moving one of said rods.

8. In a motor vehicle, in combination, a pair of parallel gear shifter rods, each adapted to be moved in opposite directions from a neutral position, two operating bars parallel to said rods and adjacent thereto, an arm on each of said rods having a part bearing on each of said bars, and lugs on said bars adapted to selectively engage one of said parts and thereby move one of said rods.

9. In a motor vehicle, in combination, a pair of parallel gear shifter rods, each adapted to be moved in opposite directions from a neutral position, two operating bars parallel to said rods and having operating lugs, an arm on each of said rods having a part arranged in the path of travel of a lug on each bar, and means for selectively engaging one of said lugs with one of said parts to thereby move one of said rods.

10. In a motor vehicle, in combination, a pair of gear shifter rods, each adapted to move in either of two directions from a neutral position, two operating elements connected to move in opposite directions from inoperative to operative positions, common means for positively rotating said elements simultaneously to selectively connect one of said elements with one of said rods in position to shift the same, and means independent of the first means for effecting said movement of the elements in opposite directions to operate said shifter rods.

11. In a motor vehicle, in combination, a pair of gear shifter rods, each adapted to move in either of two directions from a neutral position, two operating elements geared together to be moved simultaneously in opposite directions from inoperative to operative positions, common means for positively rotating said elements to selectively connect either of them to one only of said rods to shift the latter, and means independent of the first means for so moving said elements.

12. In a motor vehicle, in combination, speed changing gears, gear shifter arms having sleeves, rods at right angle to said arms, rotatable and reciprocable in said sleeves, projections on said rods, spring pressed means in said sleeves, means for rotating said rods so as to bring a projection on one rod in line with the spring pressed means in one sleeve, and means for reciprocating said rods and thus actuating one shifter arm.

13. In a motor vehicle, in combination, speed changing gears, gear shifter arms having sleeves, rods at right angles to said arms, rotatable and reciprocable in said sleeves, projections on said rods, spring pressed means in said sleeves, means for rotating said rods so as to bring a projection on one rod in line with the spring pressed means in one sleeve, and clutch operated means for reciprocating said rods and thus actuating one shifter arm.

14. In a motor vehicle, in combination, speed changing gears comprising a main shaft and a lay shaft, a gear shifter arm having sleeves, rods at a distance from said gears and parallel to said shafts, said rods being rotatable and reciprocable in said sleeves, spring pressed pins in said arm extending into said sleeves, projections in said arm extending into said sleeves, projections on said rods movable into and out of said sleeves, means to rotate said rods to bring a projection on one rod in line with the spring pressed pin in the sleeve, and means to reciprocate the rods to carry said projection into contact with said pin so that further reciprocating will actuate the shifter arm.

15. In a motor vehicle, in combination, speed changing gears, comprising a main shaft and a lay shaft, a gear shifter arm having sleeves, rods at a distance from said gears and parallel to said shafts, said rods being rotatable and reciprocable in said sleeves, spring pressed pins in said arms extending into said sleeves, projections on said rods movable into and out of said sleeves, means to rotate said rods to bring a projection on one rod in line with the spring pressed pin in the sleeve, and clutch operating means to reciprocate the rods to carry said projection into contact with said pin so that further reciprocating will actuate the shifter arm.

16. In a motor vehicle, in combination, speed changing gears, gear shifter arms, and means for actuating one of said arms said means comprising parallel rods arranged to reciprocate in opposite directions, gearing for rotating said rods to select the shifter arm to be actuated and clutch operated means for reciprocating said rods and the selected shifter arm.

17. In a motor vehicle, in combination, clutch operating means, two parallel reciprocable rods, one end of each rod being provided with rack teeth, a spur gear between and meshing with the teeth on said rods, and gearing between said spur gear and said clutch operating means to reciprocate said rods in opposite directions at each operating of the clutch.

18. In a motor vehicle, in combination, clutch operating means, two parallel reciprocable rods one end of each rod being provided with rack teeth and the forward end of each rod being provided with pinions, a spur gear meshing with the rack teeth and a third pinion meshing with the pinions at the front end of said rods, means for turning said third pinion to rotate said rods, and gearing connecting said spur gear and said clutch operating means to reciprocate said rods whenever the clutch is operated.

19. In a motor vehicle, in combination, speed changing gears, a gear shifter arm, a shifter bar to which said arm is secured, a sleeve carrying member provided with a pocket projecting from said bar, a rod reciprocable through said sleeve, a projection on said rod arranged to enter said pocket when the rod is reciprocated in one direction and move the gears into neutral position, and means for reciprocating said rod.

20. In a motor vehicle, in combination, speed changing gears, a gear shifter arm, a shifter bar to which said arm is secured, a sleeve carrying member projecting from said bar, a rod reciprocable through said sleeve, a pocket in said sleeve around said rod, a projection on said rod arranged to enter said sleeve when the rod is reciprocated in one direction, and move the gears into neutral position, a clutch and clutch operating means for reciprocating said rod.

21. In a motor vehicle, in combination, speed changing gears, gear shifter arms, rotatable and reciprocable rods for actuating said arms, means for rotating the rods to select the shifter arm to be actuated by the reciprocation of one of the rods, a clutch operating mechanism, and means controlled by said clutch operating mechanism for reciprocating the rods in one direction and shifting the gears into neutral when the clutch is thrown out, and for reciprocating the rods in the other direction and bringing into mesh the gear controlled by the selected shifter arm when the clutch is thrown in.

22. In a motor vehicle, in combination, speed changing gears, two gear shifter arms, two shifter bars to which the shifter arms are secured, two parallel members projecting laterally above and below each of said bars, each having at the end a sleeve parallel to the bars said sleeves each having a pocket, a rotatable and reciprocable rod passing through the upper sleeves from each bar and a similar rod passing through the lower sleeves from each bar, projections on said rods one arranged to enter each of said pockets to shift the gears in neutral position upon the reciprocation of the rods in one direction, a spring pressed pin in each of said members projecting into the pocket and contacting with the rod in the sleeve, means for rotating said rods so that a projection in the pocket of a predetermined sleeve will contact with the spring pressed pin in said pocket upon the reciprocation in the opposite direction and thus move the sleeve in that direction, such moving of the sleeve acting to move a shifter bar, the arm carried thereby and the gear shifted by the arm in the same direction.

In testimony whereof I affix my signature.

JESSE G. VINCENT.